United States Patent
Duggleby et al.

(12) 
(10) Patent No.: US 12,214,889 B2
(45) Date of Patent: Feb. 4, 2025

(54) INTEGRAL PROPULSION AND AUXILIARY POWER GENERATION SYSTEM FOR ROCKET ENGINE POWERED AIRCRAFT

(71) Applicant: Venus Aerospace Corp., Houston, TX (US)

(72) Inventors: Andrew Thomas Duggleby, Friendswood, TX (US); Nicholas D. Cardwell, Houston, TX (US); Christian Bailey, Palo Alto, CA (US)

(73) Assignee: Venus Aerospace Corp., Houston, TX (US)

( * ) Notice: Subject to any disclaimer, the term of this patent is extended or adjusted under 35 U.S.C. 154(b) by 155 days.

(21) Appl. No.: 17/885,597

(22) Filed: Aug. 11, 2022

(65) Prior Publication Data

US 2024/0051671 A1  Feb. 15, 2024

(51) Int. Cl.
| | |
|---|---|
| *B64D 27/02* | (2006.01) |
| *B64D 37/00* | (2006.01) |
| *B64D 41/00* | (2006.01) |
| *F02C 6/00* | (2006.01) |
| *F02C 7/36* | (2006.01) |

(Continued)

(52) U.S. Cl.
CPC ........... *B64D 27/023* (2013.01); *B64D 37/00* (2013.01); *B64D 41/00* (2013.01); *F02C 6/00* (2013.01); *F02C 7/36* (2013.01); *F02K 9/425* (2013.01); *H02K 7/108* (2013.01); *H02K 7/116* (2013.01);

(Continued)

(58) Field of Classification Search
CPC ... F02C 6/00; F02C 7/36; F02K 9/425; B64D 27/023; B64D 37/00; B64D 41/00
See application file for complete search history.

(56) References Cited

U.S. PATENT DOCUMENTS

| | | | | |
|---|---|---|---|---|
| 8,572,948 | B1 * | 11/2013 | Pinera | F02K 9/48 |
| | | | | 60/221 |
| 2008/0016846 | A1 * | 1/2008 | Spadaccini | F02K 1/64 |
| | | | | 60/267 |
| 2014/0305098 | A1 * | 10/2014 | Elias | F02K 9/48 |
| | | | | 60/205 |

FOREIGN PATENT DOCUMENTS

| | | | | |
|---|---|---|---|---|
| EP | 3736427 | A1 * | 11/2020 | ............ B64D 33/02 |
| KR | 20220083169 | A * | 6/2022 | |

OTHER PUBLICATIONS

English Translation of KR-20220083169-A (Year: 2022).*

(Continued)

*Primary Examiner* — Anthony Ayala Delgado
(74) *Attorney, Agent, or Firm* — Osha Bergman Watanabe & Burton LLP

(57) ABSTRACT

An integral propulsion and auxiliary power generation system includes a rocket engine, a liquid propellant supply system, an auxiliary electrical system, and a transmission system. The liquid propellant supply system is configured to supply a liquid fuel and a liquid oxidizer to the rocket engine. The liquid propellant supply system includes a gas generator configured to burn a mixture of the liquid fuel and the liquid oxidizer to generate a combustion gas stream, and a gas turbine configured to convert the kinetic energy of the combustion gas stream into mechanical energy. The auxiliary electrical system includes a power generator configured to convert mechanical energy into electrical energy and an electric load device electrically coupled to the power generator. The transmission system is configured to mechanically couple the gas turbine and the power generator to selectively transfer mechanical energy between the gas turbine and the power generator.

21 Claims, 3 Drawing Sheets

(51) Int. Cl.
*F02K 9/42* (2006.01)
*H02K 7/108* (2006.01)
*H02K 7/116* (2006.01)
*H02K 7/18* (2006.01)
*H02K 11/00* (2016.01)

(52) U.S. Cl.
CPC ....... *H02K 7/1823* (2013.01); *H02K 11/0094* (2013.01); *F05D 2220/70* (2013.01)

(56) References Cited

OTHER PUBLICATIONS

EP-3736427-A1 (Year: 2020).*
English Translation (Year: 2020).*
English Translation (Year: 2022).*
Brett Tingley, "Blasting The Air In Front Of Hypersonic Vehicles With Lasers Could Unlock Unprecedented Speeds", The Drive, Nov. 27, 2020.

* cited by examiner

INTEGRAL PROPULSION AND AUXILIARY POWER GENERATION SYSTEM FOR ROCKET ENGINE POWERED AIRCRAFT

FIELD

The present disclosure relates to auxiliary power generation systems for aircraft and, more particularly, to integral propulsion and auxiliary power generation systems for rocket engine powered aircraft.

BACKGROUND AND SUMMARY

This section provides background information related to the present disclosure which is not necessarily prior art. This section provides a general summary of the disclosure and is not a comprehensive disclosure of its full scope or all of its features.

Aircraft electrical systems may be powered by energy generated onboard the aircraft during flight or by onboard energy storage devices. Auxiliary power generation systems onboard aircraft are oftentimes associated with the main propulsion system of the aircraft for purposes of efficiency. As such, different types and configurations of auxiliary power generation systems may be used to accommodate different types and configurations of aircraft propulsion systems. Although energy may be produced and exist in different forms within an aircraft propulsion system, ultimately, electricity is most often produced by electromagnetic generators that convert the rotational energy of a rotating shaft into electric power using the principles of electromagnetic induction.

Propulsion systems of commercial aircraft oftentimes include a gas turbine engine, e.g., a jet engine, including a compressor, a combustion chamber, and a turbine mechanically coupled to the compressor by a shaft. Air is compressed by the compressor, mixed with a fuel in the combustion chamber, and burned to produce a high-temperature pressurized gas that drives rotation of the turbine and the shaft coupled thereto. The exhaust gases from the turbine are supplied to a nozzle to produce thrust. The mechanical energy of the rotating shaft between the compressor and the turbine may be readily tapped and converted to electrical energy by an electromagnetic generator onboard the aircraft. In addition, because the source of rotational energy is the main power shaft of the aircraft propulsion system, the amount of electricity generated onboard a jet engine powered aircraft may be readily controlled or adjusted to meet the demands of high-power auxiliary electrical systems. For example, auxiliary power generation systems of jet engine powered aircraft are generally capable of generating and supplying sufficient electricity to power communications, navigation, and lighting systems onboard the aircraft continuously for several hours during flight.

Propulsion systems of rocket engine powered aircraft, on the other hand, generally include a combustion chamber and a nozzle. A pressured mixture of liquid propellants, including a fuel and a liquid oxidizer, are supplied to the combustion chamber and burned to produce exhaust gases that are accelerated through the nozzle to produce thrust. Rocket engines, however, do not include a main power shaft and thus do not inherently function as a source of rotational energy that may be used by an electromagnetic generator to produce electricity. As such, aircraft powered by rocket engines oftentimes rely on onboard energy storage devices, e.g., batteries, to supply the electrical energy needed for operation of onboard electrical systems. In situations where the power demands of the auxiliary electrical systems are low or only exist for a relatively short duration, for example, less than one-hour, sufficient electricity may be supplied by onboard batteries without adding substantial weight to the aircraft.

To increase the auxiliary capabilities of rocket engine powered aircraft, it may be desirable to develop a system that can be used to generate electrical energy onboard the aircraft. In addition, it may be desirable for such a system to be associated with the main propulsion system of the aircraft to efficiently meet the demands of high-power auxiliary electrical systems.

An integral propulsion and auxiliary power generation system for rocket engine powered aircraft is disclosed. The integral propulsion and auxiliary power generation system comprises a rocket engine, a liquid propellant supply system, an auxiliary electrical system comprising a power generator and an electric load device, and a transmission system. The rocket engine is configured to burn a pressurized mixture of liquid propellants including a liquid fuel and a liquid oxidizer to generate thrust. The liquid propellant supply system is configured to supply the liquid fuel and the liquid oxidizer to the rocket engine. The liquid propellant supply system comprises a gas generator and a gas turbine. The gas generator is configured to burn a mixture of the liquid fuel and the liquid oxidizer to generate a combustion gas stream. The gas turbine is in fluid communication with the gas generator and is configured to convert the kinetic energy of the combustion gas stream into mechanical energy. The power generator is configured to convert mechanical energy into electrical energy. The transmission system is configured to mechanically couple the gas turbine and the power generator to selectively transfer mechanical energy between the gas turbine and the power generator. The electric load device is electrically coupled to the power generator.

In combination, the transmission system and the power generator may be configured to convert mechanical energy generated by the gas turbine into electrical energy.

The gas turbine may comprise a first drive shaft mechanically coupled to and driven by rotation of a plurality of rotor blades, and the power generator may comprise a second drive shaft. In such case, the transmission system may be configured to mechanically couple the first drive shaft of the gas turbine to the second drive shaft of the power generator to selectively transfer mechanical energy between the gas turbine and the power generator.

The transmission system may comprise a gearbox configured to transfer rotational energy at a desired gear ratio between the first drive shaft of the gas turbine and the second drive shaft of the power generator.

The transmission system may comprise a clutch configured to selectively engage and disengage rotational energy transfer between the first drive shaft of the gas turbine and the second drive shaft of the power generator.

The system may further comprise a power converter electrically coupled to the power generator and the electric load device. The power converter may be configured to transfer electrical energy generated by the power generator to the electric load device and to control or adjust at least one of the current, voltage, and frequency of the electrical energy prior to transferring the electrical energy to the electric load device.

The system may further comprise an energy storage device electrically coupled to the power generator. The energy storage device may be configured to convert electrical energy generated by the power generator into stored chemical energy.

The energy storage device may be electrically coupled to the liquid propellant supply system and may be configured to supply electrical energy to the liquid propellant supply system such that the liquid fuel and the liquid oxidizer are supplied to the rocket engine without operation of the gas generator.

The energy storage device may comprise a battery, capacitor, supercapacitor, fuel cell, a superconducting magnetic energy storage device, or a combination thereof.

The liquid propellant supply system may further comprise a fuel pump and an oxidizer pump. The fuel pump may have an inlet in fluid communication with a fuel source and an outlet in fluid communication with the rocket engine. The oxidizer pump may have an inlet in fluid communication to an oxidizer source and an outlet in fluid communication with the rocket engine. The fuel pump and the oxidizer pump may be configured to respectively supply the liquid fuel and the liquid oxidizer to the rocket engine.

The transmission system may be configured to mechanically couple the gas turbine to the fuel pump and the oxidizer pump to selectively transfer mechanical energy from the gas turbine to the fuel pump and the oxidizer pump.

The transmission system may comprise a clutch configured to selectively engage and disengage rotational energy transfer between a first drive shaft of the gas turbine and a second drive shaft of the fuel pump or the oxidizer pump.

The gas generator may be in fluid communication with the fuel pump and the oxidizer pump. In such case, the gas generator may be configured to receive the liquid fuel from the fuel pump and the liquid oxidizer from the oxidizer pump.

The rocket engine may be a cryogenic rocket engine and at least one of the liquid fuel and the liquid oxidizer may be a cryogenic liquid.

The system may further comprise a heat exchanger in thermal communication with the electric load device and in fluid communication with at least one of the fuel pump and the oxidizer pump. The heat exchanger may be configured to transfer thermal energy from the electric load device to a volume of the liquid fuel or a volume of the liquid oxidizer flowing through the heat exchanger to cool the electric load device to a temperature at which electrically conductive material in the electric load device reaches a superconducting state.

The system may further comprise a superconducting magnetic energy storage device configured to convert electrical energy generated by the electric power generator into stored potential energy. In such case, the system may further comprise a heat exchanger in thermal communication with the superconducting magnetic energy storage device and in fluid communication with at least one of the fuel pump and the oxidizer pump. The heat exchanger may be configured to transfer thermal energy from the superconducting magnetic energy storage device to a volume of the liquid fuel or a volume of the liquid oxidizer flowing through the heat exchanger to cool the superconducting magnetic energy storage device to a temperature at which electrically conductive material in the superconducting magnetic energy storage device reaches a superconducting state.

The electric load device may comprise a high-powered laser, plasma actuator, electromagnetic transmitter, electromagnetic receiver, communication device, or a combination thereof.

The system may further comprise a controller configured to control operation and integration of the liquid propellant supply system, the transmission system, the power generator, the electric load device, or a combination thereof.

The controller may be configured to command the liquid propellant supply system to supply the gas generator with a volume of the liquid fuel and a volume of the liquid oxidizer in response to an electrical power demand signal generated by the electric load device.

The controller may be configured to command the power generator to generate mechanical energy. In such case, the controller may be configured to command the transmission system to transfer the mechanical energy generated by the power generator to the liquid propellant supply system such that the liquid fuel and the liquid oxidizer are supplied to the rocket engine without operation of the gas generator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
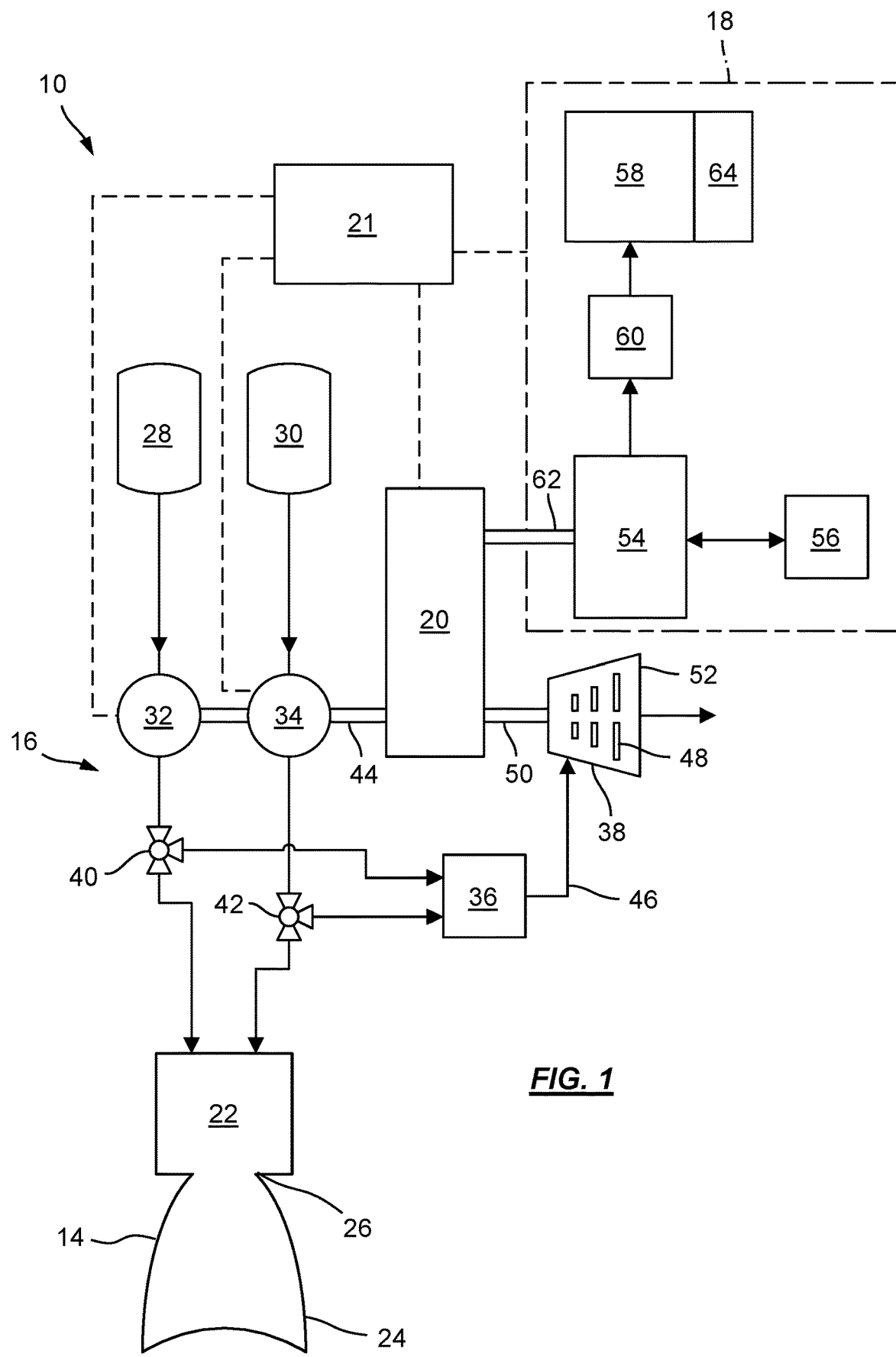
FIG. 1 is a process flow diagram of an integral propulsion and auxiliary power generation system for an aircraft, including a liquid propellant rocket engine, a liquid propellant supply system, an auxiliary electrical system, and a transmission system configured to transfer power between the liquid propellant supply system and the auxiliary electrical system.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
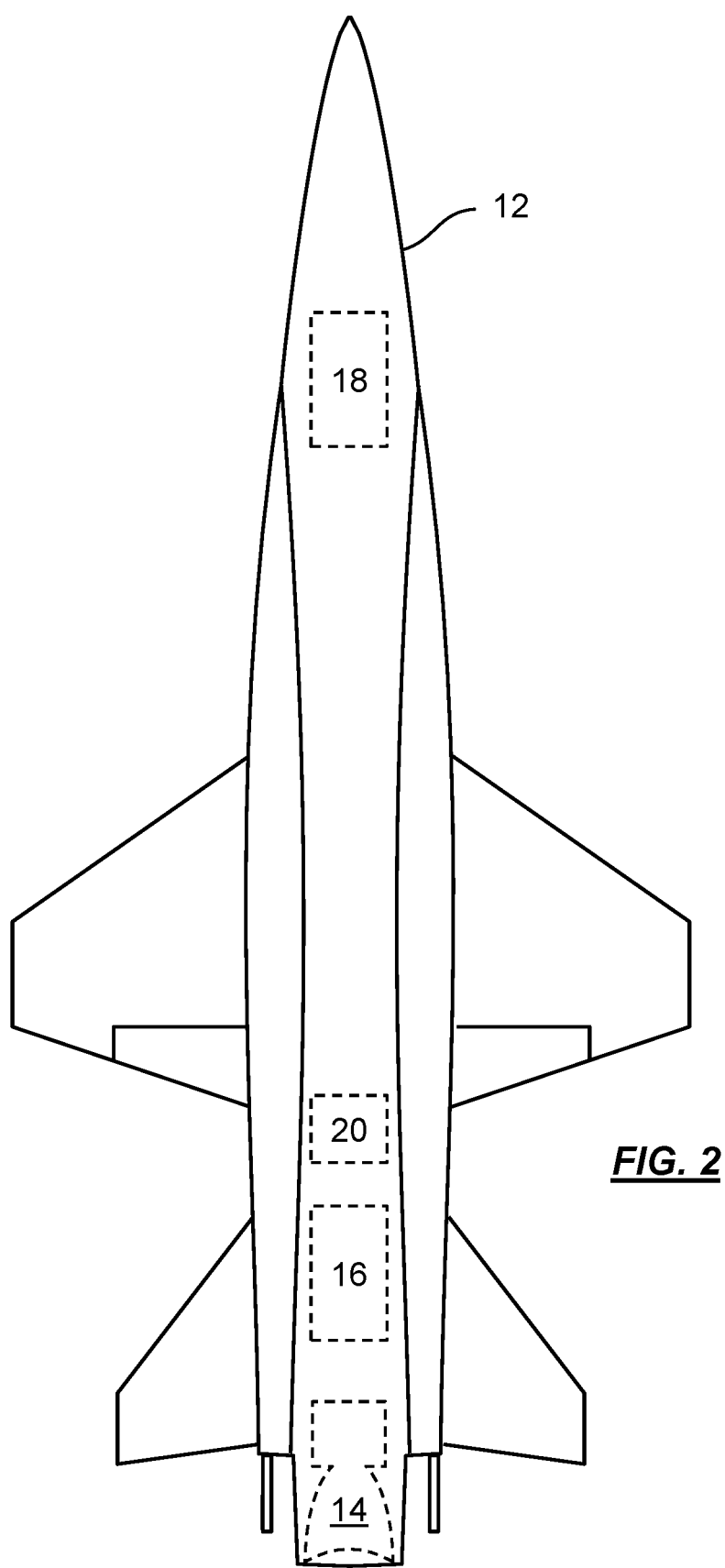
FIG. 2 is a schematic depiction of an aircraft including the integral propulsion and auxiliary power generation system of FIG. 1.

FIG. 1 depicts a process flow diagram of an integral propulsion and auxiliary power generation system 10 for an aircraft, such as the aircraft 12 depicted in FIG. 2. The integral propulsion and auxiliary power generation system 10 may be used onboard a manned aircraft or an unmanned aircraft, such as a drone, to generate electrical energy onboard the aircraft 12 and to supply the generated electrical energy to electrical load devices onboard the aircraft 12. Unlike energy storage devices oftentimes provided onboard rocket engine-powered aircraft, which must be charged prior to flight, the presently disclosed integral propulsion and auxiliary power generation system 10 can be used to generate relatively high-power electrical energy, which may be used to power electrical load devices having relatively high-power electrical energy demands, e.g., greater than 1 megawatt (MW).

The integral propulsion and auxiliary power generation system 10 includes a liquid propellant rocket engine 14, a liquid propellant supply system 16, an auxiliary electrical system 18, and a transmission system 20. The transmission system 20 is configured to transfer mechanical power between the liquid propellant supply system 16 and the auxiliary electrical system 18. For example, the transmission system 20 may be used onboard the aircraft 12 to transfer mechanical power from the liquid propellant supply system 16 to the auxiliary electrical system 18, and the auxiliary electrical system 18 may be configured to convert the transferred mechanical power to electric power, which may be stored onboard the aircraft 12 and/or used to power various auxiliary electrical components of the aircraft 12. In some embodiments, the integral propulsion and auxiliary power generation system 10 may include an electronic control module or controller 21 configured to control operation and integration of one or more of the rocket engine 14, the liquid propellant supply system 16, the auxiliary electrical system 18, and the transmission system 20.

The liquid propellant rocket engine 14 is configured to burn a pressurized mixture of liquid propellants including a fuel and an oxidizer to generate thrust which propels the aircraft 12 in a forward direction. The liquid propellant rocket engine 14 depicted in FIG. 1 includes a combustion chamber 22 and a nozzle 24 separated by a throat 26. A pressurized mixture of liquid propellants including a fuel and an oxidizer are supplied to the combustion chamber 22 and burned, producing hot combustion gases. Due to the high pressure of the combustion gases, the gases are forced through the throat 26 and into the nozzle 24, where the gases expand. The force exerted on the walls of the combustion chamber 22 and the nozzle 24 by the combustion gases propels the aircraft 12 in a forward direction while accelerating and exhausting the combustion gases from the nozzle 24 in the opposite direction.

The liquid propellant supply system 16 is configured to supply the rocket engine 14 with a pressurized mixture of liquid propellants including a fuel and an oxidizer. The liquid propellant supply system 16 may be mechanically powered, electrically powered, or powered by a combination of mechanical and electrical power. In embodiments where the liquid propellant supply system 16 is mechanically powered, the mechanical power required to supply the pressurized mixture of liquid propellants to the rocket engine 14 may be generated by operating the liquid propellant supply system 16 according to a gas-generator cycle, a staged combustion cycle, an expander cycle, or according to any other type of power cycle. The liquid propellant supply system 16 depicted in FIG. 1 includes a fuel source 28, an oxidizer source 30, a fuel pump 32, an oxidizer pump 34, a gas generator 36, and a gas turbine 38. The fuel source 28 may comprise, for example, liquid hydrogen, ammonia, monomethylhydrazine, or a liquid hydrocarbon (e.g., methane) and the oxidizer source 30 may comprise liquid oxygen or hydrogen peroxide, for example. In some embodiments, at least one of the liquid propellants may be cryogenic and may be stored at temperatures less than or equal to about 250° C. at atmospheric pressure.

The fuel pump 32 is in fluid communication with the fuel source 28 and the oxidizer pump 34 is in fluid communication with the oxidizer source 30. The fuel pump 32 and the oxidizer pump 34 are configured to respectively supply a volume of fuel from the fuel source 28 and a volume of an oxidizer from the oxidizer source 30 to the combustion chamber 22 of the rocket engine 14 at a relatively high pressure, as compared to the pressure within the combustion chamber 22. In addition, the fuel pump 32 and the oxidizer pump 34 are configured to respectively supply a fuel and an oxidizer to the gas generator 36. In some embodiments, the liquid propellant supply system 16 may include a first valve 40 and a second valve 42 respectively configured to divert a portion or all the fuel and the oxidizer flowing from the fuel pump 32 and the oxidizer pump 34 to the gas generator 36.

The fuel pump 32 and the oxidizer pump 34 may be rotodynamic pumps. In such case, each of the pumps 32, 34 may include an impeller, propeller, or rotor mounted on a drive shaft 44 coupled to the transmission 20. Rotation of the drive shaft 44 may drive rotation of the impeller, propeller, or rotor of the pumps 32, 34 and impart kinetic energy to the liquid propellant being pumped (i.e., the fuel or the oxidizer), which may increase the pressure thereof. In the embodiment depicted in FIG. 1, both the fuel pump 32 and the oxidizer pump 34 are mounted on a single drive shaft 44, however, other arrangements are possible. For example, in some embodiments, the fuel pump 32 may be coupled to the transmission 20 via a first drive shaft and the oxidizer pump 34 may be separately coupled to the transmission 20 via a second drive shaft. Examples of rotodynamic pumps include centrifugal pumps and axial-flow pumps.

In some embodiments, the fuel pump 32 and/or the oxidizer pump 34 may be electrically powered (e.g., by the auxiliary electrical system 18). In such case, operation of the fuel pump 32 and/or the oxidizer pump 34 may be independently controlled by the controller 21. In embodiments where the fuel pump 32 and/or the oxidizer pump 34 are electrically powered, the fuel pump 32 and/or the oxidizer pump 34 may operate independently of the transmission 20. Using the controller 21 to control the operation of the fuel pump 32 and/or the oxidizer pump 34, instead of the transmission 20, may allow for more precise flow control by the pumps 32, 34 and/or may allow for independent sizing of the gas turbine 38, without regard to the peak power demands of the pumps 32, 34. In some embodiments, the fuel pump 32 and/or the oxidizer pump 34 may be configured such that operation of the pumps 32, 34 may be carried out either by rotation of the drive shaft 44 (or shafts) or by electric power. In some embodiments, the fuel pump 32 and/or the oxidizer pump 34 may not be mechanically coupled to each other or to the transmission 20, for example, by the drive shaft 44.

The gas generator 36 and the gas turbine 38 together provide the fuel pump 32 and the oxidizer pump 34 with sufficient mechanical power to supply the combustion chamber 22 of the rocket engine 14 with a fuel and an oxidizer. The gas generator 36 and the gas turbine 38 may be controlled so that the fuel pump 32 and the oxidizer pump 34 respectively supply the combustion chamber 22 of the rocket engine 14 with the fuel and the oxidizer at desired flow rates and pressures. The gas generator 36 is configured to receive a volume of a fuel from the fuel pump 32 and a volume of an oxidizer from the oxidizer pump 34 and to burn a mixture of the fuel and the oxidizer to generate a combustion gas stream 46. The combustion gas stream 46 may be discharged from an outlet of the gas generator 36 and supplied to the gas turbine 38.

The gas turbine 38 is configured to convert the kinetic energy of the combustion gas stream 46 into mechanical energy (i.e., rotational energy). The mechanical energy generated by the gas turbine 38 may be used to power operation of the fuel pump 32 and the oxidizer pump 34. Additionally or alternatively, the mechanical energy generated by the gas turbine 38 may be supplied or transferred to the auxiliary electrical system 18 and used to generated electrical energy. The gas turbine 38 may include a plurality of rotor blades 48 mounted on or rotatably coupled to a drive shaft 50 and disposed within a housing 52. In such case, when the combustion gas stream 46 in introduced into an inlet of the housing 52, the rotor blades 48 convert the kinetic energy of the combustion gas stream 46 into rotational energy, which drives rotation of the drive shaft 50. Exhaust gases may be discharged from an outlet of the housing 52 to a circumambient environment or may be directed to another component of the liquid propellant supply system 16, e.g., to the combustion chamber 22 of the rocket engine 14.

The auxiliary electrical system 18 is configured to convert mechanical energy generated by the liquid propellant supply system 16 into electrical energy. The auxiliary electrical system 18 may be configured to supply electrical energy to one or more auxiliary electrical components of the aircraft 12. Additionally or alternatively, the auxiliary electrical system 18 may be configured to supply electrical energy to one or more components of the liquid propellant supply system 16, e.g., to the fuel pump 32, the oxidizer pump 34, the gas generator 36, and/or the gas turbine 38. The auxiliary electrical system 18 depicted in FIG. 1 includes a power generator 54, an energy storage device 56, one or more electric power-consuming or electric load devices 58, and an optional power converter 60.

The power generator 54 is configured to convert mechanical energy (i.e., rotational energy) into electrical energy and to supply the electrical energy to the energy storage device 56, the one or more electric load devices 58, and/or the power converter 60. The power generator 54 may be an electromagnetic generator including a stator and a rotor mounted on or rotatably coupled to a drive shaft 62. The power generator 54 may be configured to convert the rotational energy of the rotating drive shaft 62 into electrical energy (i.e., to generate an electric current). The energy storage device 56 is configured to store electrical energy in the form of chemical energy and may comprise one or more batteries, capacitors, supercapacitors, and/or fuel cells. For example, the energy storage device 56 may be configured to convert electrical energy generated by the power generator 54 into stored chemical energy. The power generator 54 optionally may be configured to receive electrical energy (e.g., from the energy storage device 56) and to convert the electrical energy into mechanical energy (e.g., to rotate the drive shaft 62).

Figure 3:
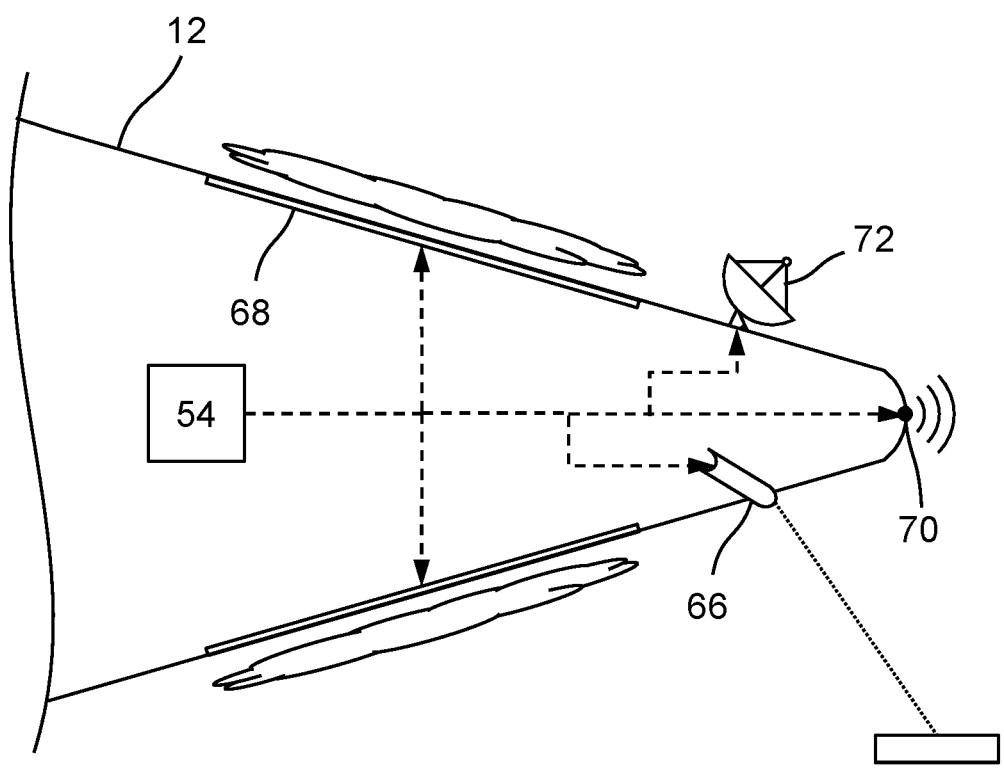
FIG. 3 is a schematic depiction of a portion of the aircraft of FIG. 2 depicting a high-powered laser, plasma actuator, electromagnetic transmitter and/or receiver, and communications device powered by a power generator onboard the aircraft.

As shown in FIG. 3, the one or more electric load devices 58 powered by the power generator 54 may comprise one or more of a high-powered laser 66, plasma actuator 68 (e.g., for aerodynamic flow control over surfaces of the aircraft 12), electromagnetic transmitter and/or receiver 70 (e.g., for object detection), communications device 72, or a combination thereof.

In some embodiments, one or more of the electric load devices 58 and/or the energy storage device 56 may be in thermal communication with a heat exchanger 64. In such case, the heat exchanger 64 may be used to transfer thermal energy away from the electric load devices 58 and/or the energy storage device 56 to cool the devices 58, 56. For example, the heat exchanger 64 may be used to transfer thermal energy away from the electric load devices 58 and/or the energy storage device 56 to at least one of the liquid propellants. In embodiments where at least one of the liquid propellants is in cryogenic form, a cryogenic liquid propellant may be supplied to the heat exchanger 64 to cool the electric load devices 58 and/or the energy storage device 56 to a temperature at which the electrically conductive and/or electrochemically active material(s) therein reach a superconducting state. In aspects where the energy storage device 56 comprises a superconducting magnetic energy storage device, cooling the electrically conductive material of the energy storage device 56 to a superconducting state may increase the storage efficiency, duration of storage, and cycle life of the energy storage device 56.

The power converter 60 may be configured to process and control the electrical energy generated by the power generator 54 into a suitable form for use in the energy storage device 56 and/or the one or more electric load devices 58. For example, the power converter 60 may convert alternating current (AC) into direct current (DC) or vice versa and may change the voltage and/or the frequency of the electric energy generated by the power generator 54 prior to supplying the electric energy to the one or more electric load devices 58 and/or to the energy storage device 56.

The transmission system 20 may be configured to transfer mechanical power between (i) the gas turbine 38 and at least one of the fuel pump 32 and the oxidizer pump 34 of the liquid propellant supply system 16, (ii) the gas turbine 38 and the power generator 54, and/or (iii) the power generator 54 and at least one of the fuel pump 32 and the oxidizer pump 34. The transmission system 20 may include an arrangement of gears, valves, pulleys, chains, clutches, shafts, and/or other mechanical or electrical devices configured to transfer mechanical energy between various components of the liquid propellant supply system 16 and the auxiliary electrical system 18 at a desired ratio, to selectively engage and disengage mechanical energy transfer between the components, and/or to control the direction of mechanical energy transfer. For example, the drive shafts 44, 50, 62 may be directly or indirectly coupled to one another via the transmission system 20. The transmission system 20 may selectively couple the drive shafts 44, 50, 62 to one another so that mechanical energy transfer therebetween may be selectively engaged or disengaged, as desired. Examples of clutches include, permanent magnet clutches, magnetic particle clutches, hydromechanical clutches, vacuum clutches, mechanical clutches, and electrical clutches. In some embodiments, two or more of the drive shafts 44, 50, 62 may be of unitary one-piece construction.

In the embodiment depicted in FIG. 1, the transmission system 20 is discretely mechanically coupled to: (i) the fuel pump 32 and the oxidizer pump 34 by the drive shaft 44, (ii) the gas turbine 38 by the drive shaft 50, and the power generator 54 by the drive shaft 62. However, other arrangements are possible. For example, the transmission system 20 may be respectively mechanically coupled to the fuel pump 32, the oxidizer pump 34, the gas turbine 38, and/or the power generator 54 by other means. In some embodiments, the transmission system 20 may be at least partially defined by the fuel pump 32, the oxidizer pump 34, the gas turbine 38, and/or the power generator 54. In some embodiments, the transmission system 20 may not be mechanically coupled to the fuel pump 32 and/or the oxidizer pump 34, for example, in situations where the fuel pump 32 and/or the oxidizer pump 34 are operated electrically, for example, by the controller 21.

The controller 21 may be configured to control the operation and integration of various components of the rocket engine 14, the liquid propellant supply system 16, the auxiliary electrical system 18, the transmission system 20, or a combination thereof. For example, the controller 21 may be configured to control operation of the fuel pump 32, oxidizer pump 34, and/or the valves 40, 42 so that a desired amount of the fuel and the oxidizer are supplied to the rocket engine 14 and/or the gas generator 36. The controller 21 may be configured to control operation of the gas generator 36 so that the amount and ratio of fuel and oxidizer burned in the gas generator 36 produce a sufficient combustion gas stream 46 to support the energy demands of the gas turbine 38 and the fuel pump 32 and oxidizer pump 34.

In addition, the controller 21 may be configured to control operation of the transmission system 20. For example, the controller 21 may command the transmission system 20 to engage or disengage power transmission between (i) the drive shaft 50 of the gas turbine 38 and the drive shaft 44 of the fuel pump 32 and/or the oxidizer pump 34, (ii) the drive shaft 50 of the gas turbine 38 and the drive shaft 62 of the power generator 54, and/or (iii) the drive shaft 62 of the power generator 54 and the drive shaft 44 of the fuel pump 32 and/or the oxidizer pump 34.

In some embodiments, the controller 21 may be configured to control operation of the energy storage device 56. For example, the controller 21 may be configured to command the energy storage device 56 to supply electric energy for operation of the fuel pump 32, the oxidizer pump 34, the power generator 54, and/or the one or more electric load devices 58. In such case, the controller 21 may be configured to control operation of the power converter 60 so that the electric energy supplied to the fuel pump 32, the oxidizer pump 34, the power generator 54, and/or the electric load devices 58 exhibits a suitable frequency and/or voltage.

In some embodiments, the controller 21 may be configured to command the energy storage device 56 to supply electric energy to the power generator 54 and to command the power generator 54 to convert the electric energy to mechanical energy, e.g., to rotate the drive shaft 62. In addition, the controller 21 may be configured to command the transmission system 20 to transfer the rotational energy of the rotating drive shaft 62 of the power generator 54 to the fuel pump 32, the oxidizer pump 34, and/or the gas generator 36. Using the energy storage device 56 to supply the necessary power for operation of the fuel pump 32, the oxidizer pump 34, and/or the gas generator 36 may allow for on-demand precise control of the fuel pump 32, the oxidizer pump 34, and/or the gas generator 36, which may decrease the amount of time required to start-up the rocket engine 14 and improve the reliability of engine 14 start-up. In addition, using the energy storage device 56 to supply the necessary power for operation of the fuel pump 32 and/or the oxidizer pump 34 may avoid having to use the gas generator 36 to start the rocket engine 14, which may reduce fuel and oxidant consumption.

In some embodiments, the controller 21 may be configured to receive input signals from one or more components of the rocket engine 14, the liquid propellant supply system 16, the auxiliary electrical system 18, and/or the transmission system 20 and to initiate various operating programs in response thereto.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An integral propulsion and auxiliary power generation system for rocket engine powered aircraft, the system comprising:
   a rocket engine configured to burn a pressurized mixture of liquid propellants including a liquid fuel and a liquid oxidizer to generate thrust;
   a liquid propellant supply system configured to supply the liquid fuel and the liquid oxidizer to the rocket engine, the liquid propellant supply system comprising:
      a gas generator configured to burn a mixture of the liquid fuel and the liquid oxidizer to generate a combustion gas stream, and
      a gas turbine in fluid communication with the gas generator, the gas turbine being configured to convert the kinetic energy of the combustion gas stream into mechanical energy;
   a power generator configured to convert mechanical energy into electrical energy;
   a transmission system configured to mechanically couple the gas turbine and the power generator to selectively transfer mechanical energy between the gas turbine and the power generator;
   wherein the transmission system comprises a clutch configured to selectively engage and disengage rotational energy transfer between a first drive shaft of the gas turbine and a second drive shaft of a fuel pump or an oxidizer pump; and
   an electric load device electrically coupled to the power generator.

2. The system of claim 1, wherein, in combination, the transmission system and the power generator are configured to convert mechanical energy generated by the gas turbine into electrical energy.

3. The system of claim 1, wherein the gas turbine comprises a first drive shaft mechanically coupled to and driven by rotation of a plurality of rotor blades, wherein the power generator comprises a second drive shaft, and wherein the transmission system is configured to mechanically couple the first drive shaft of the gas turbine to the second drive shaft of the power generator to selectively transfer mechanical energy between the gas turbine and the power generator.

4. The system of claim 3, wherein the transmission system comprises a gearbox configured to transfer rotational energy at a desired gear ratio between the first drive shaft of the gas turbine and the second drive shaft of the power generator.

5. The system of claim 3, wherein the transmission system comprises a clutch configured to selectively engage and disengage rotational energy transfer between the first drive shaft of the gas turbine and the second drive shaft of the power generator.

6. The system of claim 1, further comprising:
   a power converter electrically coupled to the power generator and the electric load device, the power converter configured to transfer electrical energy generated by the power generator to the electric load device and to control or adjust at least one of the current, voltage, and frequency of the electrical energy prior to transferring the electrical energy to the electric load device.

7. The system of claim 1, further comprising:
   an energy storage device electrically coupled to the power generator, wherein the energy storage device is configured to convert electrical energy generated by the power generator into stored chemical energy.

8. The system of claim 7, wherein the energy storage device is electrically coupled to the liquid propellant supply system and is configured to supply electrical energy to the liquid propellant supply system such that the liquid fuel and the liquid oxidizer are supplied to the rocket engine without operation of the gas generator.

9. The system of claim 7, wherein the energy storage device comprises a battery, capacitor, supercapacitor, fuel cell, a superconducting magnetic energy storage device, or a combination thereof.

10. The system of claim 1, wherein the liquid propellant supply system further comprises:
    the fuel pump, wherein the fuel pump has an inlet in fluid communication with a fuel source and an outlet in fluid communication with the rocket engine; and
    the oxidizer pump, wherein the oxidizer pump has an inlet in fluid communication to an oxidizer source and an outlet in fluid communication with the rocket engine, wherein the fuel pump and the oxidizer pump are configured to respectively supply the liquid fuel and the liquid oxidizer to the rocket engine.

11. The system of claim 10, wherein the transmission system is configured to mechanically couple the gas turbine to the fuel pump and the oxidizer pump to selectively transfer mechanical energy from the gas turbine to the fuel pump and the oxidizer pump.

12. The system of claim 10, wherein the gas generator is in fluid communication with the fuel pump and the oxidizer pump, and wherein the gas generator is configured to receive the liquid fuel from the fuel pump and the liquid oxidizer from the oxidizer pump.

13. The system of claim 10, wherein the rocket engine is a cryogenic rocket engine, and wherein at least one of the liquid fuel and the liquid oxidizer is a cryogenic liquid.

14. The system of claim 13, further comprising:
    a heat exchanger in thermal communication with the electric load device and in fluid communication with at least one of the fuel pump and the oxidizer pump, wherein the heat exchanger is configured to transfer thermal energy from the electric load device to a volume of the liquid fuel or a volume of the liquid oxidizer flowing through the heat exchanger to cool the electric load device to a temperature at which electrically conductive material in the electric load device reaches a superconducting state.

15. The system of claim 13, further comprising:
    a superconducting magnetic energy storage device configured to convert electrical energy generated by the electric power generator into stored potential energy; and
    a heat exchanger in thermal communication with the superconducting magnetic energy storage device and in fluid communication with at least one of the fuel pump and the oxidizer pump, wherein the heat exchanger is configured to transfer thermal energy from the superconducting magnetic energy storage device to a volume of the liquid fuel or a volume of the liquid oxidizer flowing through the heat exchanger to cool the superconducting magnetic energy storage device to a temperature at which electrically conductive material in the superconducting magnetic energy storage device reaches a superconducting state.

16. The system of claim 1, wherein the electric load device comprises a high-powered laser, plasma actuator, electromagnetic transmitter, electromagnetic receiver, communication device, or a combination thereof.

17. The system of claim 1, further comprising:
a controller configured to control operation and integration of the liquid propellant supply system, the transmission system, the power generator, the electric load device, or a combination thereof.

18. The system of claim 17, wherein the controller is configured to command the liquid propellant supply system to supply the gas generator with a volume of the liquid fuel and a volume of the liquid oxidizer in response to an electrical power demand signal generated by the electric load device.

19. The system of claim 17, wherein the controller is configured to command the power generator to generate mechanical energy, and wherein the controller is configured to command the transmission system to transfer the mechanical energy generated by the power generator to the liquid propellant supply system such that the liquid fuel and the liquid oxidizer are supplied to the rocket engine without operation of the gas generator.

20. An integral propulsion and auxiliary power generation system for rocket engine powered aircraft, the system comprising:
a rocket engine configured to burn a pressurized mixture of liquid propellants including a liquid fuel and a liquid oxidizer to generate thrust;
a liquid propellant supply system configured to supply the liquid fuel and the liquid oxidizer to the rocket engine, the liquid propellant supply system comprising:
a gas generator configured to burn a mixture of the liquid fuel and the liquid oxidizer to generate a combustion gas stream, and
a gas turbine in fluid communication with the gas generator, the gas turbine being configured to convert the kinetic energy of the combustion gas stream into mechanical energy;
a power generator configured to convert mechanical energy into electrical energy;
a transmission system configured to mechanically couple the gas turbine and the power generator to selectively transfer mechanical energy between the gas turbine and the power generator;
an electric load device electrically coupled to the power generator; and
a heat exchanger in thermal communication with the electric load device and in fluid communication with at least one of a fuel pump and an oxidizer pump, wherein the heat exchanger is configured to transfer thermal energy from the electric load device to a volume of liquid fuel or a volume of liquid oxidizer flowing through the heat exchanger to cool the electric load device to a temperature at which electrically conductive material in the electric load device reaches a superconducting state.

21. An integral propulsion and auxiliary power generation system for rocket engine powered aircraft, the system comprising:
a rocket engine configured to burn a pressurized mixture of liquid propellants including a liquid fuel and a liquid oxidizer to generate thrust;
a liquid propellant supply system configured to supply the liquid fuel and the liquid oxidizer to the rocket engine, the liquid propellant supply system comprising:
a gas generator configured to burn a mixture of the liquid fuel and the liquid oxidizer to generate a combustion gas stream, and
a gas turbine in fluid communication with the gas generator, the gas turbine being configured to convert the kinetic energy of the combustion gas stream into mechanical energy;
a power generator configured to convert mechanical energy into electrical energy;
a transmission system configured to mechanically couple the gas turbine and the power generator to selectively transfer mechanical energy between the gas turbine and the power generator;
an electric load device electrically coupled to the power generator;
a superconducting magnetic energy storage device configured to convert electrical energy generated by the power generator into stored potential energy; and
a heat exchanger in thermal communication with the superconducting magnetic energy storage device and in fluid communication with at least one of a fuel pump and an oxidizer pump, wherein the heat exchanger is configured to transfer thermal energy from the superconducting magnetic energy storage device to a volume of liquid fuel or a volume of liquid oxidizer flowing through the heat exchanger to cool the superconducting magnetic energy storage device to a temperature at which electrically conductive material in the superconducting magnetic energy storage device reaches a superconducting state.

* * * * *